United States Patent [19]
Keith

[11] Patent Number: 5,459,808
[45] Date of Patent: * Oct. 17, 1995

[54] FIBER OPTIC HOUSING WITH REMOVABLE CHASSIS AND METHOD USING SAME

[75] Inventor: Roger H. Keith, Austin, Tex.

[73] Assignee: Minnesota Mining and Manufacturing Company, St. Paul, Minn.

[*] Notice: The portion of the term of this patent subsequent to Apr. 18, 2012 has been disclaimed.

[21] Appl. No.: 268,312

[22] Filed: Jun. 30, 1994

[51] Int. Cl.⁶ .................................................. G02B 6/36
[52] U.S. Cl. ......................................... 385/135; 385/134
[58] Field of Search .................................. 385/134, 135, 385/136, 137, 147

[56] References Cited

U.S. PATENT DOCUMENTS

| | | | |
|---|---|---|---|
| 4,792,203 | 12/1988 | Nelson et al. | 385/135 |
| 4,824,196 | 4/1989 | Bylander | 385/134 |
| 4,898,448 | 2/1990 | Cooper | 385/135 |
| 4,900,123 | 2/1990 | Barlow et al. | 385/135 |
| 4,971,421 | 11/1990 | Ori | 385/135 |
| 5,093,887 | 3/1992 | Witte | 385/135 |
| 5,129,030 | 7/1992 | Petrunia | 385/135 |
| 5,247,603 | 9/1993 | Vidacovich et al. | 385/135 |
| 5,274,729 | 12/1993 | King et al. | 385/134 |
| 5,274,731 | 12/1993 | White | 385/135 |
| 5,287,428 | 2/1994 | Shibata | 385/135 |

*Primary Examiner*—Brian Healy
*Attorney, Agent, or Firm*—Gary L. Griswold; Walter N. Kirn; Jack V. Musgrove

[57] ABSTRACT

A fiber optic housing has a low part count, with all major parts formed by cutting, stamping or bending sheet metal, and with very few fasteners, reducing cost and simplifying assembly of the housing. In spite of the simplified construction, the housing retains great flexibility in the installation of the fibers and associated connectors, primarily due to the provision of a unique chassis which is completely removable from the housing, as well as a backplane frame which is further removable from the chassis. A novel bulkhead plate, and method of attachment thereof to the frame, are also disclosed. The chassis may have a drop center floor to more efficiently utilize space and yet still provide curved surfaces for the smooth exiting of the fibers from the housing.

16 Claims, 8 Drawing Sheets

FIBER OPTIC HOUSING WITH REMOVABLE CHASSIS AND METHOD USING SAME

BACKGROUND OF THE INVENTION

1. Field of the Invention

The present invention generally relates to junction boxes, organizers and distribution units for fiber optic cables and associated interconnection devices, and more particularly to a fiber optic housing having a novel construction which yields a low part-count, with many pans manufactured inexpensively from sheet metal.

2. Description of the Prior Art

Organizers and distribution units for optical fiber cables are known in the art, and are commonly used for the direct interconnection of pairs of optical fibers, or the cross-connection of a pair of fibers using an intermediate pigtail or jumper fiber. These devices can also be used to store excess fiber slack. When used for connection purposes, they commonly house various interconnection devices such as optical splices or connectors, for both discrete fiber pairs and multi-fiber ribbons (see, e.g., U.S. Pat. Nos. 4,792,203, 4,824,196, 5,093,887 and 5,247,603). The term "splice" usually refers to the permanent attachment of a pair of fiber ends, while the term "connector" usually refers to a device which allows for the detachment and re-attachment of the fibers; these terms should not, however, be construed in a limiting sense inasmuch as the present invention applies to fiber optic housings which receive any type of interconnection devices, including splices, connectors, couplers, splitters, etc.

As the use of optical fiber spreads, there is a growing need for housing designs which are low cost, particularly for telecommunications applications. For example, the designs disclosed in the above-mentioned patents, while rich in features, all require a large number of components, some difficult to fabricate, and an excessive number of mechanical fasteners to join the components in the fully assembled product. This not only adds to the cost of the pans, but also increases assembly time (whether in the factory or the field), and disassembly is often impractical. Several constructions require the use of special tools. Rudimentary housing designs may achieve lower cost, but they lack the flexibility in operation that is desired by major telecommunications providers.

Most conventional designs are also inadequate regarding installation of the fiber optic cables and interconnection devices. For example, most fiber distribution units provide access only through the front panel. Some designs allow removal of the top, but limited to the uppermost panel of the housing, and do not allow access at the sides. Many other prior art designs do not allow simultaneous back and front plane access. Finally, in most systems it is difficult to completely test the installation without fully positioning all components in the housing, which in turn makes it more difficult to fix a faulty installation since the cabling and connectors must then be removed from the housing (possibly several times). It would, therefore, be desirable to devise a fiber optic housing which has a reduced part count and overall simplification of component fabrication and attachment, to minimize cost as well as assembly time, and yet provide flexibility during installation and inspection of the cables and connectors. It would in particular be advantageous to allow near complete installation of the system for testing purposes while still providing full access to the managed area.

SUMMARY OF THE INVENTION

The present invention provides a device for managing a plurality of interconnections of optical fiber cables, generally comprising a housing constructed of detachable top and bottom halves which are substantially identical so as to eliminate the separate production of one major housing component. Other conventional components are provided, such as the interconnection devices, bulkhead structures for supporting those devices, front and rear panels, and mounting brackets. A novel construction is provided in which a removable chassis is disposed in the housing and a backplane frame is attached to the chassis. The chassis preferably includes structures which helps secure the top and bottom halves of the housing and the backplane frame, without the use of separate fasteners. Additional cost savings are realized in fabricating many components by bending and stamping sheet metal. A wide variety of installation techniques are available due to the separate removability of the top half of the housing, the chassis and the backplane frame, as well as the access provided through the movable front door.

BRIEF DESCRIPTION OF THE DRAWINGS

The invention will best be understood by reference to the accompanying drawings, wherein.

DESCRIPTION OF THE PREFERRED EMBODIMENT

Figure 1:
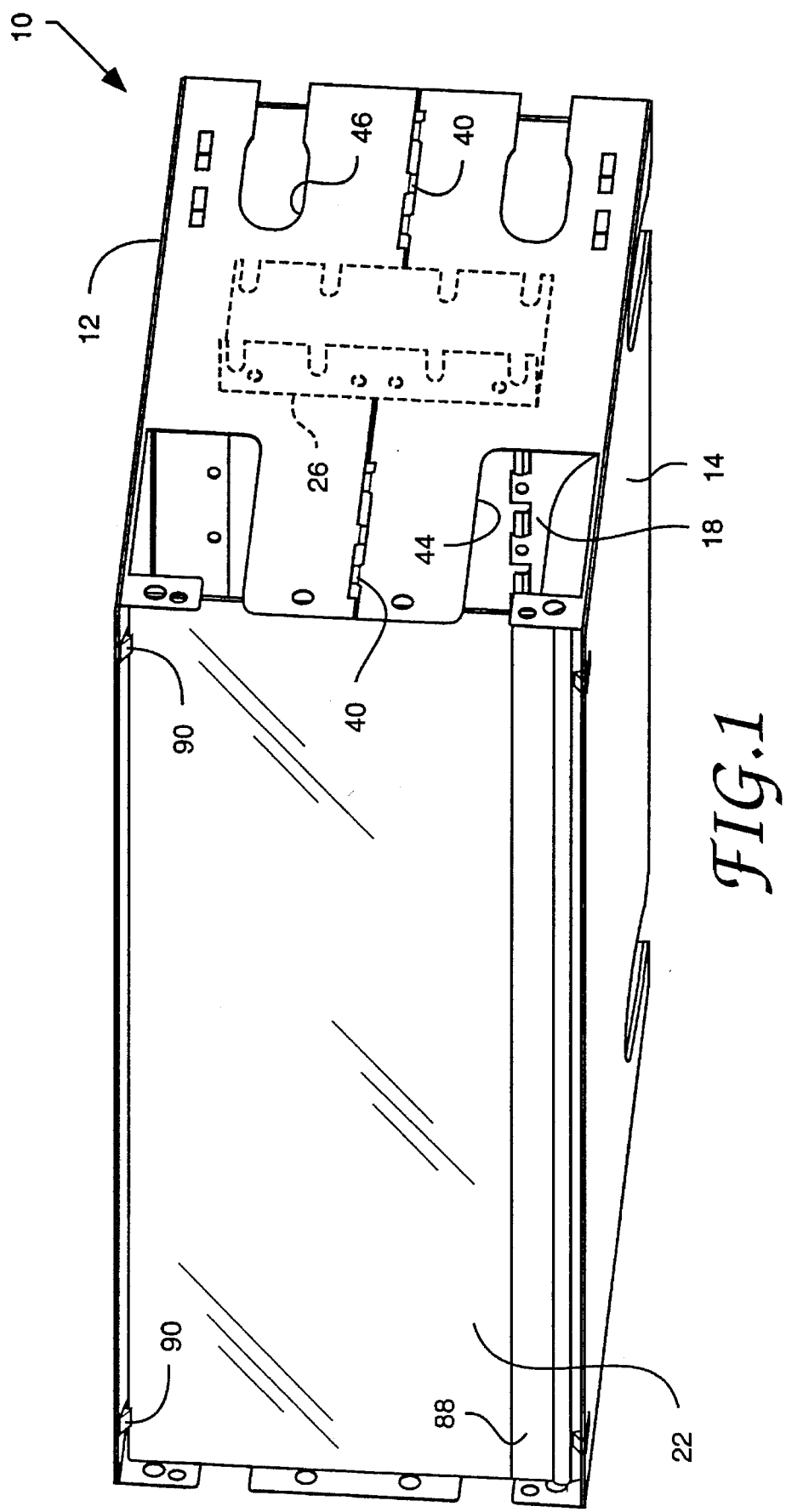
FIGS. 1 and 2 are front and rear perspective views, respectively, of the assembled fiber optic housing of the present invention.
Figure 2:
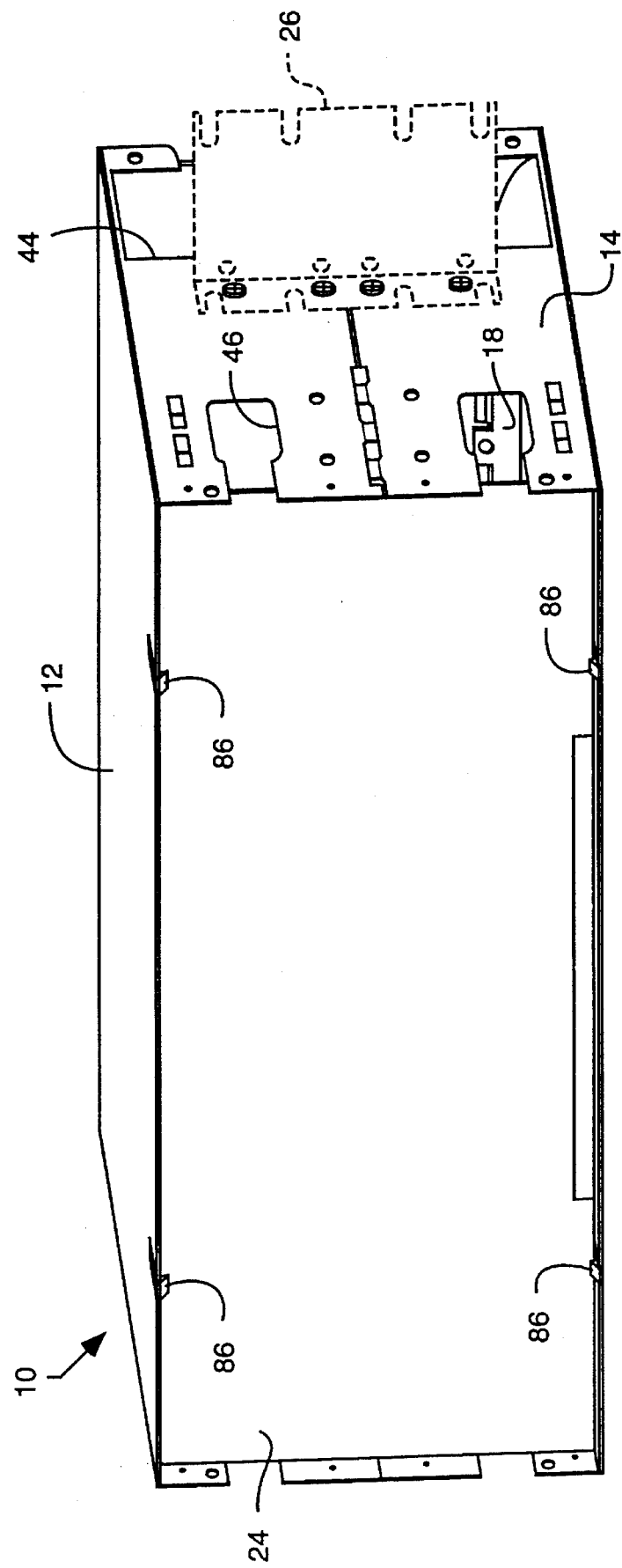
Figure 3:
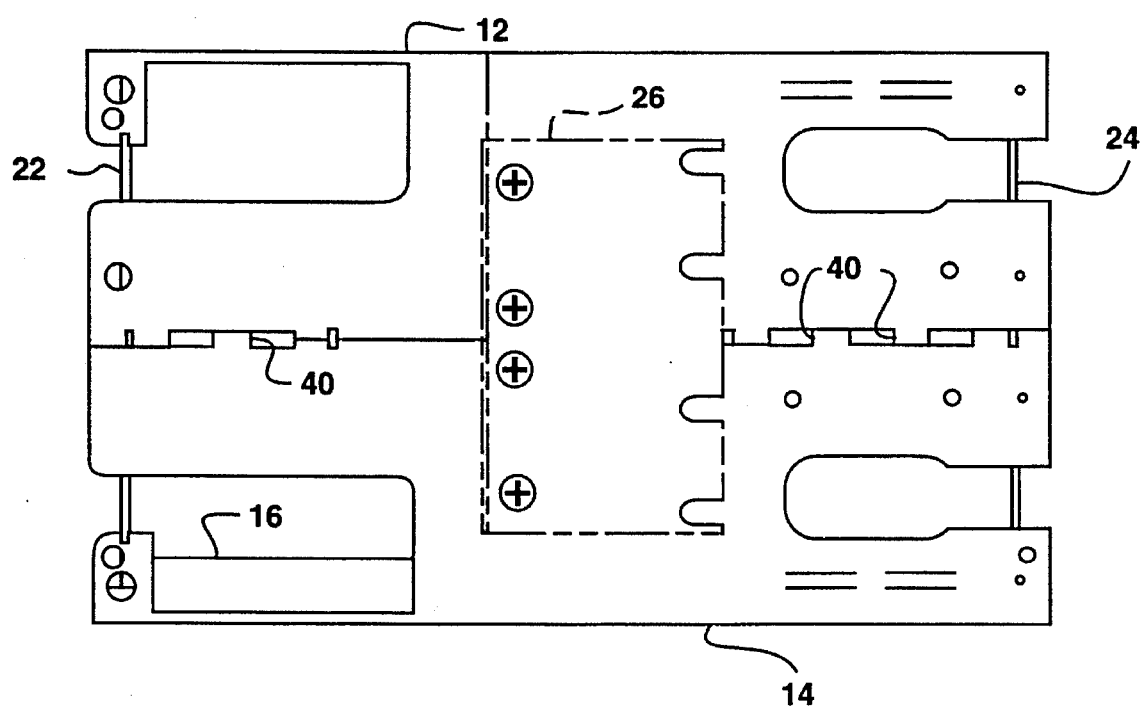
FIG. 3 is a right side elevational view of the assembled fiber optic housing of the present invention.
Figure 6:
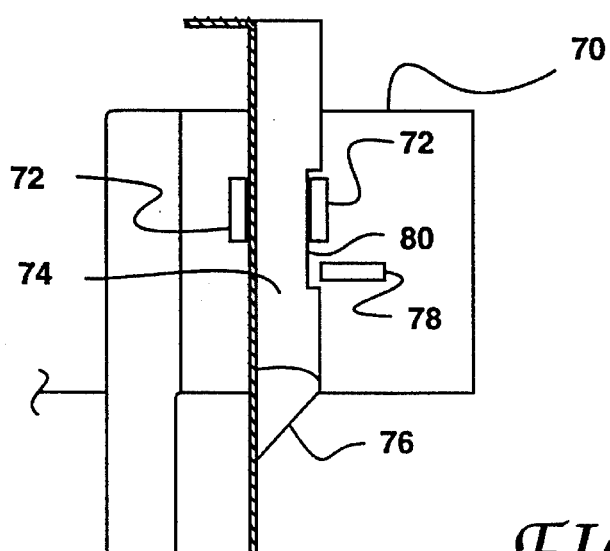
FIG. 6 is a sectional view taken along lines 6—6 of FIG. 7, detailing the attachment of the frame to the chassis using an edge plate of the frame which engages protrusions on the chassis.

With reference now to the figures, and in particular with reference to FIGS. 1 and 2, there are depicted front and rear perspectives of one embodiment 10 of the fiber optic housing of the present invention. As shown in additional detail in FIGS. 3–8, housing 10 is generally comprised of top and bottom halves or portions 12 and 14, a chassis 16 located in housing 10, a backplane frame 18 attached to chassis 16, several bulkhead plates 20 mounted on frame 18, front and rear panels 22 and 24, and two mounting brackets 26. FIGS. 1–3 illustrate housing 10 essentially fully assembled, except for the omission of bulkhead plates 20 and the associated connectors and cabling. As will become apparent upon reference to this description, housing 10 may be mounted in several different manners, such as rack or wall mounting, and further may be used for various optical fiber management purposes, such as housing fibers and interconnection devices for cross-connecting and interconnecting, as well as organizing splices, attenuators, splitters, etc., and storing excess fiber slack.

Figure 4:
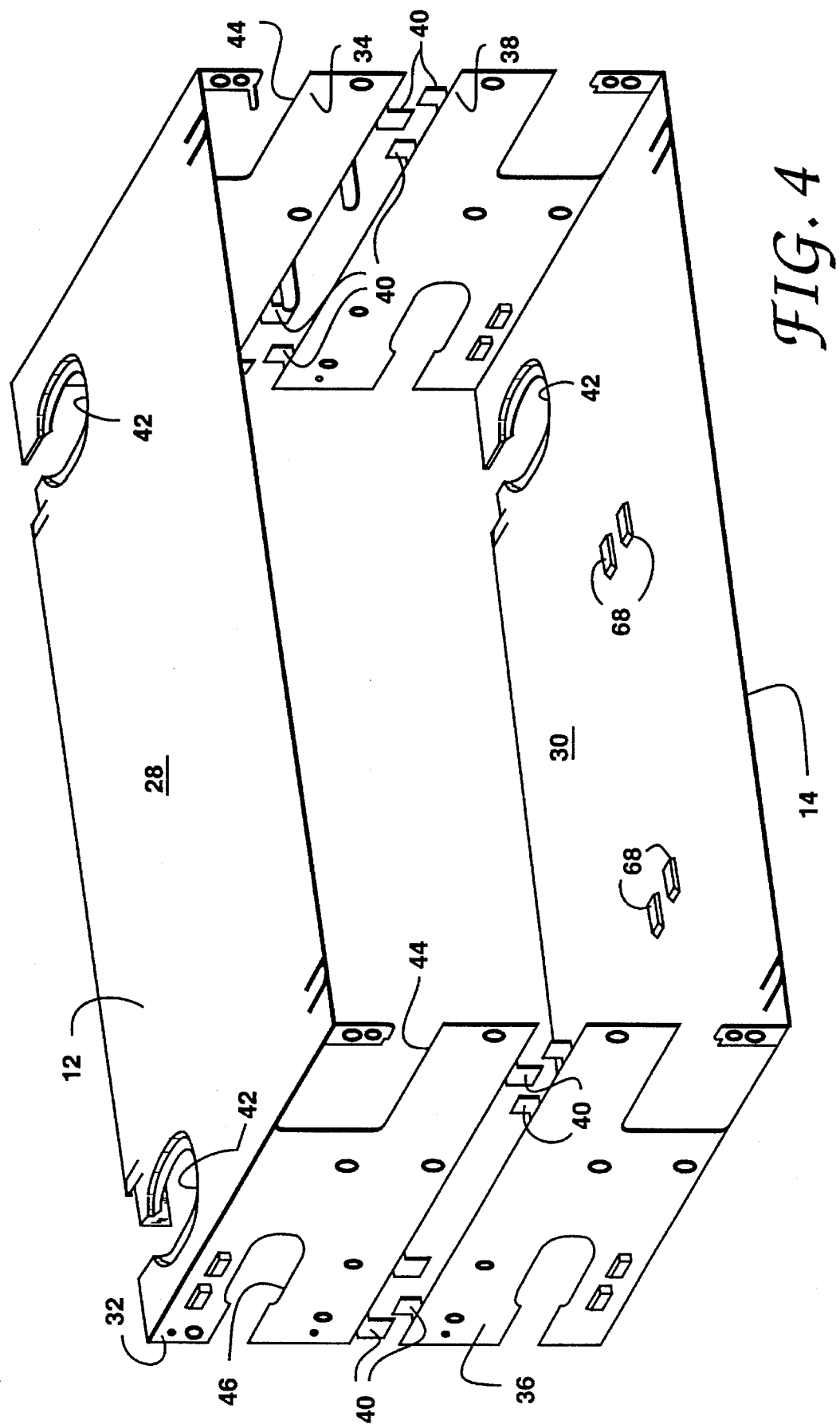
FIG. 4 is a perspective view depicting the identical top and bottom halves of the housing.

Top and bottom halves 12 and 14 are shown more clearly in FIG. 4, where it is more easily seen that they are actually identical in structure. In this regard, while the present invention contemplates the use of substantially identical top and bottom portions, in order to minimize production costs, it is understood that the two halves need not be completely identical in every detail, for certainly minor surface variations or different attachments might make the two parts appear different without detracting from the advantage achieved when the two parts are made with essentially the same basic manufacturing process. The preferred process is the die-cutting, bending and stamping of a sheet material, most preferably galvanized sheet metal. This process defines a generally rectangular base 28, 30, and sidewalls 32, 34, 36 and 38. The sidewalls extend orthogonally from the base, so that a given pair of opposing sidewalls are generally parallel when assembled. Top and bottom halves 12 and 14 may be conveniently secured together to a limited extent by the use of tabs 40 which extend from the edge of the sidewall at the interface between opposing sidewalls. Each tab lies generally parallel to the sidewalls, and is formed by bending the tab to one side of the plane formed by the sidewalls (preferably toward the inside of the housing). This construction imparts an interlocking fit between the halves which is easily accomplished by simply lowering the top onto the bottom while keeping the sidewalls generally aligned. The depicted embodiment shows the interface between opposing sidewalls to be half-way between bases 28 and 30, but it may instead be located at a position closer to one base than the other. Several cutouts 42, 44 and 46 are formed in the base and sidewalls to allow passage of the fiber optic cables. In this embodiment, all fibers can be routed and strain relieved directly to the chassis, even when it is removed from any part of the housing, and cable entries are designed in such a way that the configured chassis can be then installed in the housing even when all rear cables are secured. Cable grommet openings 42 and 46 are all slotted to the rear to make installation of the chassis into the lower half possible, and to allow attachment of the upper half, even after cables, which go through grommet openings in the housing, are attached and tied securely and permanently to the chassis. This allows the user to make sure that all fibers are free from excessive stress and tight bend radii in the open on the chassis, and to install the entire chassis without introducing either temporary or permanent stresses or tight bends.

The interior portion of housing 10 receives an chassis/frame assembly as shown in FIGS. 5–8 on which are mounted the bulkhead plates 20 and the various devices for interconnecting the respective optical fibers. Bulkhead plates 20 are generally rectangular and have a plurality of holes 48 therein for mounting the various types of conventional connector adapters (not shown). Plates 20 are removably attached to frame 18, such as by providing a lower tab 50 which fits in one of a plurality of nests or clasps 52 formed along the lower portion of frame 18, and an upper tab 54 having a hole therein which is aligned with one of the holes 56 in the upper portion of frame 18. A plastic push pin (not shown) may be used to secure tab 54 to the upper portion of the frame; the pins are held in the holes in tabs 54 so there is no need to search for screws or other fasteners. The bulkhead plates are also preferably formed from sheet metal. The plate may have only one push pin (a second can be optionally mounted in the lower hole) and is normally employed by engaging the lower edge in the nests or clasps 52. This method of attachment and release results in several benefits: the cost of one pin is removed, along with the labor of installing it; the user can remove a plate in service without reaching thereunder and disturbing fibers attached to it or attached to adjacent plates; and the user can employ the bottom holes to seal or secure the plates against unauthorized removal using a wired lead seal, cable tie, pop rivet, or other common means.

Figure 7:
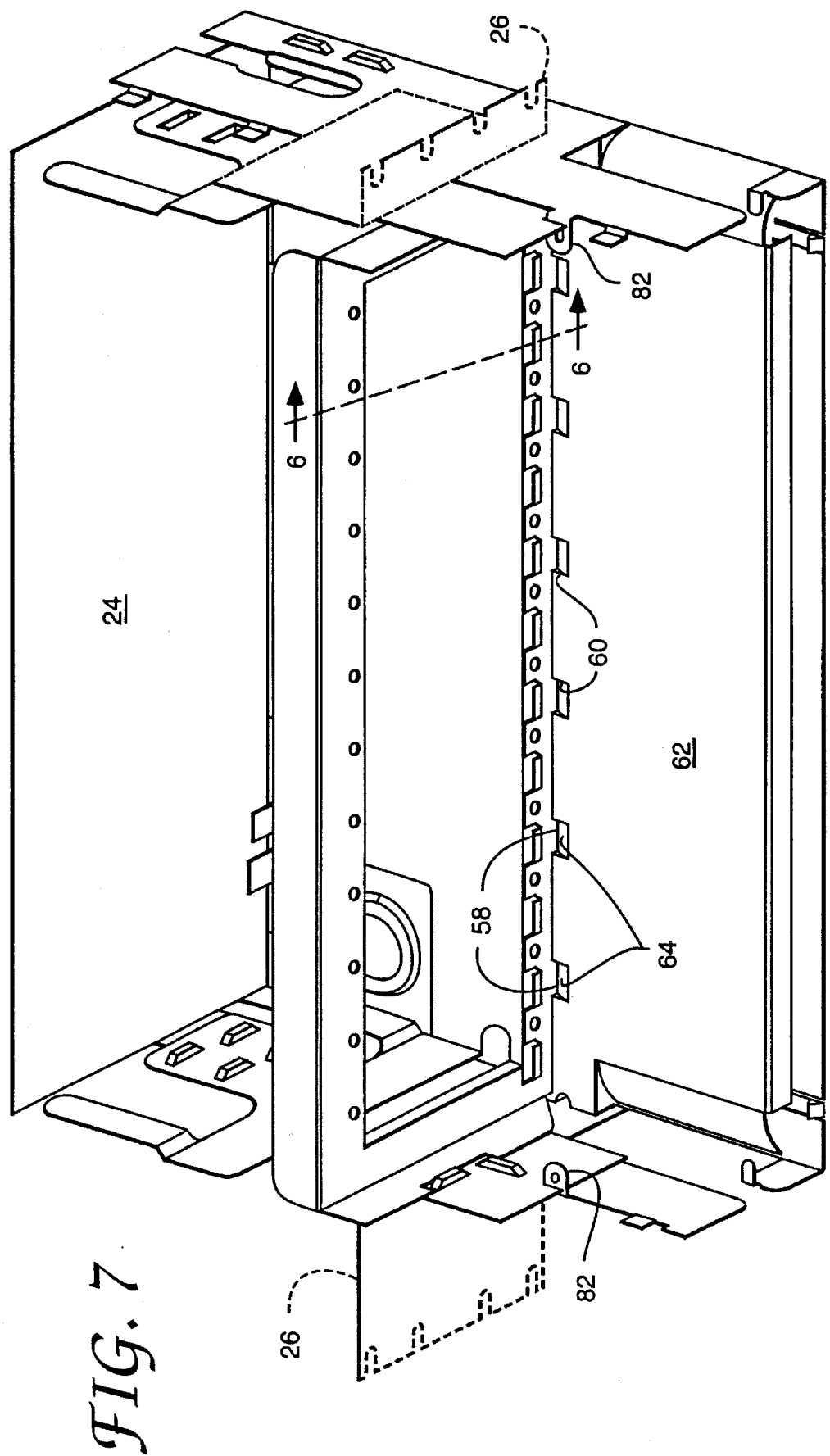
FIG. 7 is a perspective view showing complete attachment of the frame to the chassis.
Figure 8:
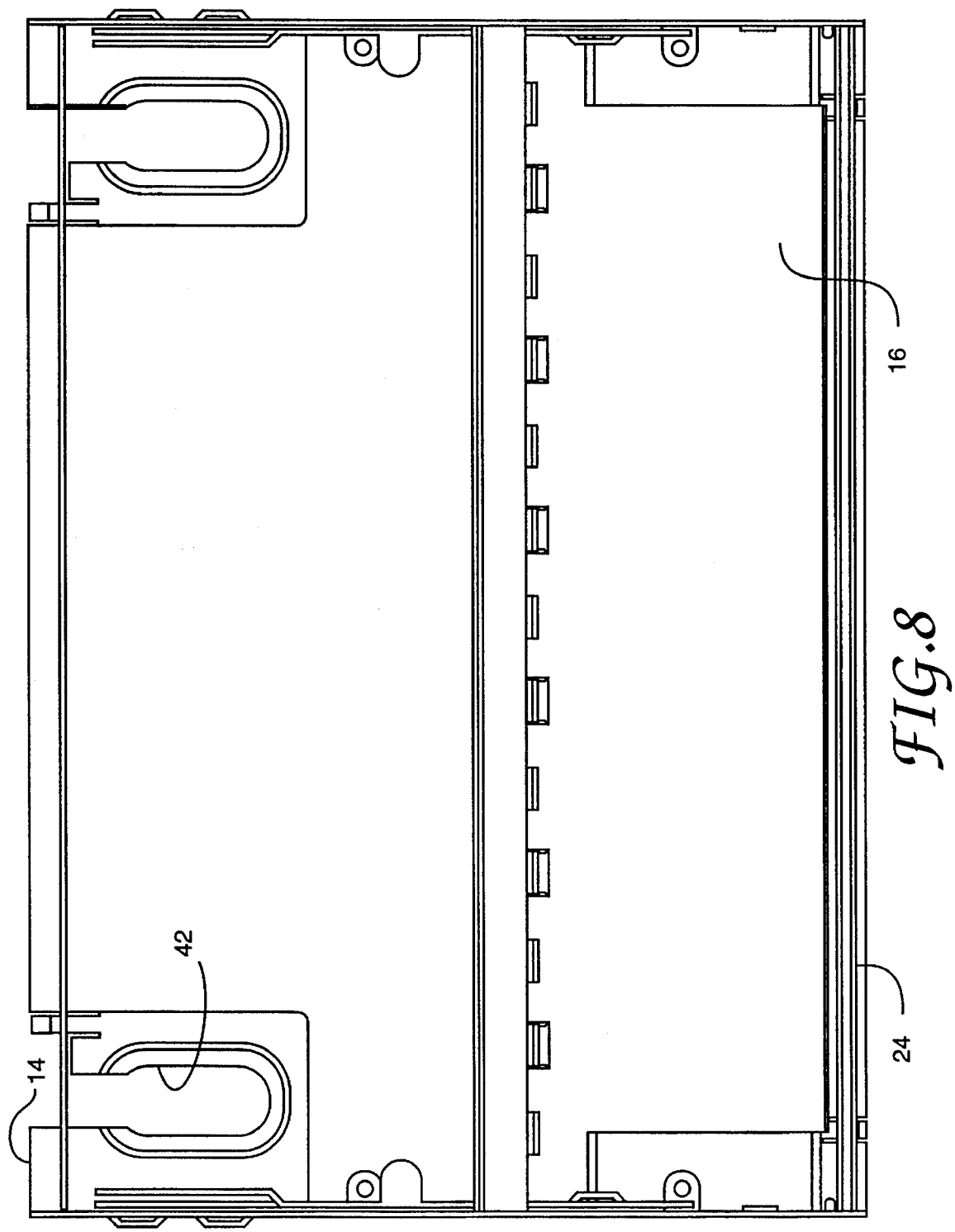
FIG. 8 is a top plan view of the assembly of FIG. 7.

Frame 18 may be securely attached to chassis 16 without any separate fasteners. Frame 18 has along its lowest edge a plurality of extensions or tabs 58 which mate with openings or slots 60 formed in a floor portion 62 of chassis 16. As seen in FIG. 7, slots 60 are advantageously formed by stamping out a tab 64 which is ramped slightly downward (frame 18 may also be formed by cutting, stamping and bending sheet metal). When chassis 16 is positioned in housing 10, tab 64 ramps away from the front end of the housing, so that frame 18 may be attached to chassis 16 even while chassis 16 is positioned completely within housing 10 and top half 12 is secured; this is accomplished by orienting frame 18 at an oblique angle with respect to floor 62 as tabs 58 are inserted in slots 60.

The vertical orientation of frame 18 may be maintained in several ways. The inner surface of base 28 (the "ceiling" of the housing) preferably has at least one pair of straps or bridges protruding toward the interior of housing 10. These straps are positioned to engage either side of an upper stabilizer bar 66 formed on frame 18. The straps on base 28 are not visible in FIG. 4, but the corresponding straps 68 in base 30 may be seen. These straps are optional and can be incorporated to provide side-pull resistance to the frame when top half 12 has been secured to bottom half 14. Frame 18 may also be held by a frictional fit between two upright members 70 formed on chassis 16, i.e., the length of frame 18 is approximately equal to the distance between the two uprights 70 (chassis 16 may also be formed by cutting, stamping and bending sheet metal). The vertical alignment is further reinforced by additional protruding straps 72 on uprights 70 which engage either side of narrow side plates 74 (see FIG. 6). The leading edge 76 of each plate 74 is tapered so that plates 74 are more easily guided between their respective pairs of straps 72 as frame 18 is moved straight downward into chassis 16. Those skilled in the art will appreciate, however, that at least one of the straps 72 can interfere with the above-mentioned method of installing frame 18 on chassis 16 by rotating frame 18 up from an oblique position, as this would cause the back edge of plate 74 to catch on the forwardmost ones of straps 72. Accordingly, a third strap 78 which is ramped sufficiently is placed proximate straps 72 such that, as frame 18 is flipped upwardly, strap 78 raises or cams plate 74 up and over the forwardmost strap 72. A cutout 80 may be formed in plate 74 to accommodate strap 78.

Figure 5:
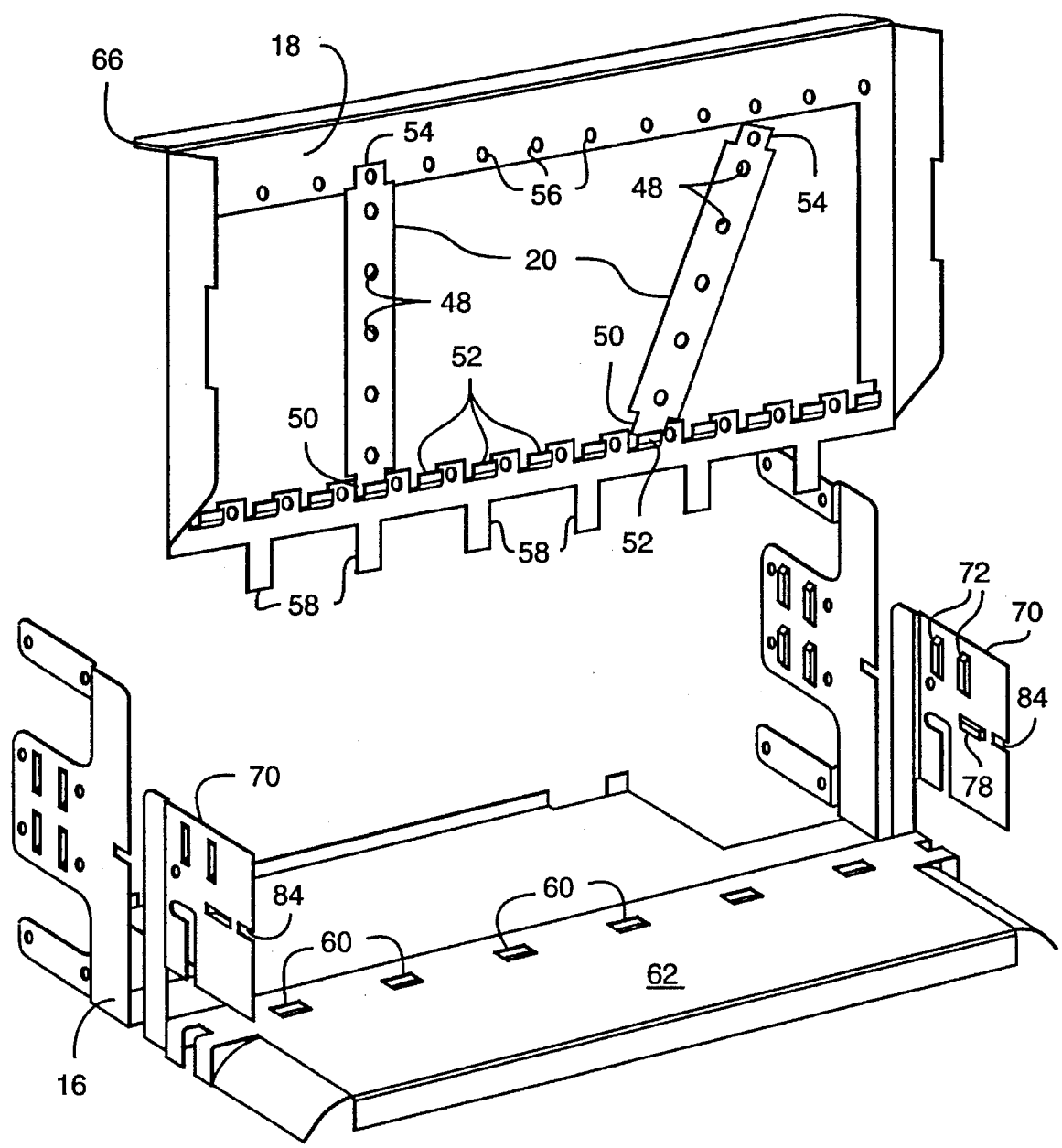
FIG. 5 is an exploded perspective view illustrating the attachment of the backplane frame to the chassis.

As shown in FIGS. 5 and 7, chassis 16 may be designed to further secure top and bottom halves 12 and 14, again without separate fasteners, such as by providing latches 82 on the sidewalls of the halves which fit in corresponding slots 84 in uprights 70. Latches 82 are captured in slots 84 through the action of dropping top half 12 onto bottom half 14, then sliding it rearwardly a short distance. Otherwise, keying pins, press inserts or screws, for example, could be used to lock the halves permanently in the engaged position. All of the major components (top and bottom halves 12 and 14, chassis 16, frame and 18) may be even more tightly secured by providing fasteners (screws) for mounting brackets 26 which extend not only through the brackets and the housing but also through the chassis or frame.

Front and rear panels 22 and 24 are simple rectangular pieces of sheet metal. Rear panel 24 may conveniently be secured using prongs 86 formed in bases 28, 30. From panel 22 may be hingedly attached to the front of housing 10, such as by using an extruded living hinge 88. Prongs or bumps 90 retain front panel 22 in the closed position. Other conventional components may be provided, such as rubber grommets (not shown) in the cable cutouts, or a padlock (not shown) for the from panel.

Figure 9:
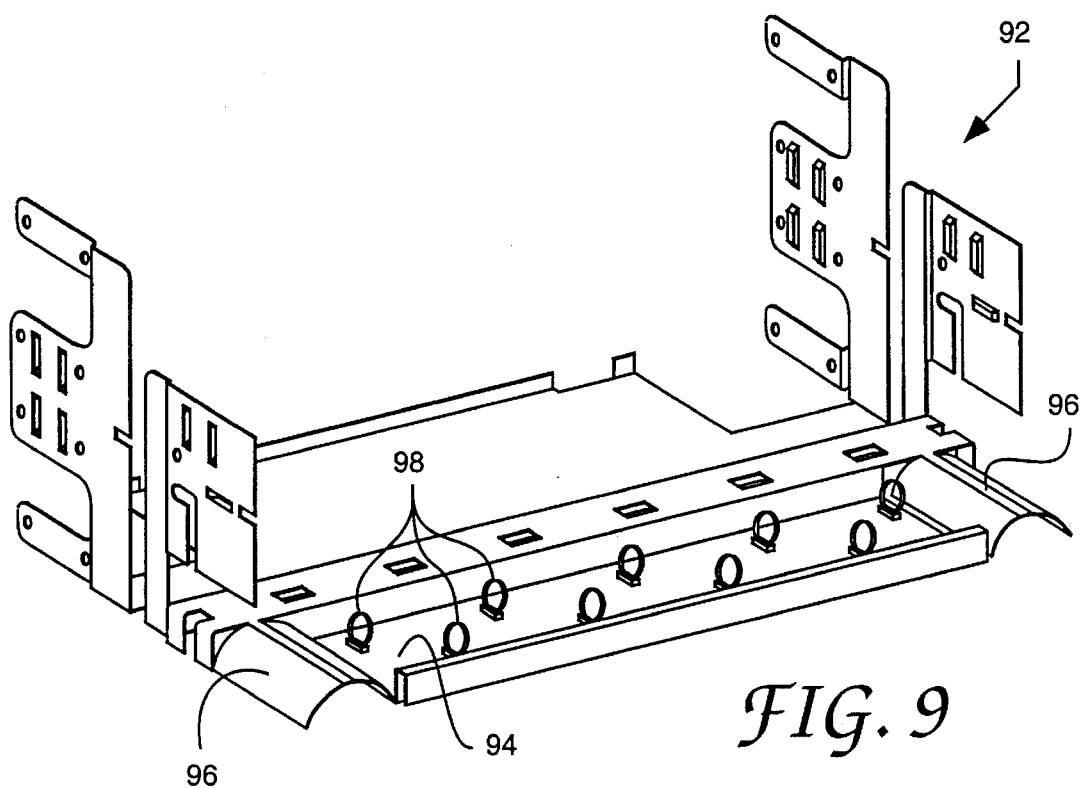
FIG. 9 is a perspective view of an alternative chassis with a drop floor according to the present invention.
Figure 10:
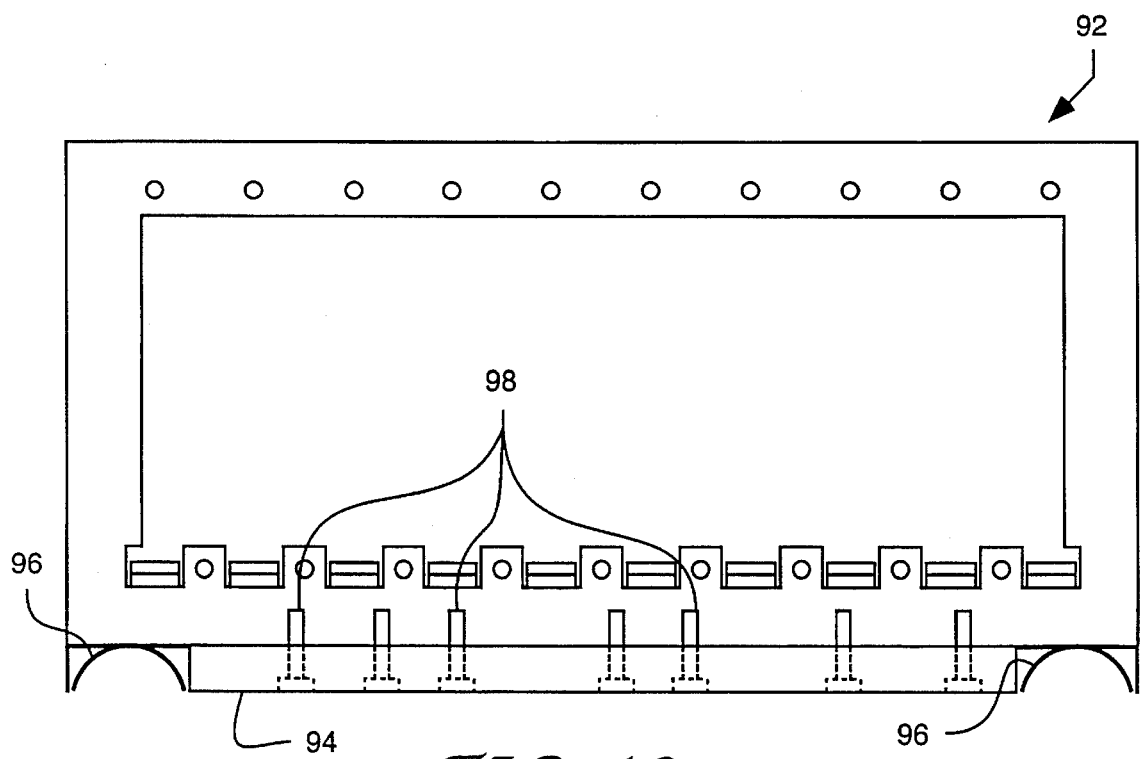
FIG. 10 is a front elevational view of the chassis of FIG. 9.

An alternative chassis 92 is depicted in FIGS. 9–10. In this design, the central portion of the floor 94 is sunken or lowered with respect to the jumper "waterfalls" 96 on either side of the central flat area. These waterfalls are arcuate surfaces formed along the edge sections of the floor, and are used to provide a smooth path for fiber exiting the housing. In the prior art chassis, which included such a ridge, the central flat portion was at the same relative height as the top of the waterfalls 96. This construction presented several problems relating to the provision of fiber retention devices such as rings 98, including "jogging" (undue bending) of the fibers passing through the rings and terminating near the upper portion of a bulkhead plate 20, interference between the rings and the lower connectors on plates 20, and a general waste of space under the chassis floor. The new design overcomes these problems, and also places the centerline of the rings near the same level as the ridges, providing an even smoother exit path for the fibers.

The present invention thus presents a fiber optic housing which has a minimal number of parts—about 10 compared to 20 major pans in a comparable prior art housing, and only 28 small parts (screws, etc.) vs. 109 in the prior art system. The new design can be assembled in 17 steps (only two requiring a tool) instead of 119 steps (67 requiring a tool). The lower part count and simplified construction benefit not only the manufacture/cost of the housing, but also assembly (or disassembly) in the field or factory. Fewer separate fasteners means fewer holes, etc., which need to be formed in components, and fewer headaches over lost or mislaid fasteners. The present design also avoids the use of plastic fasteners which break too often. Spot welds, rivets and crimps, which all add tooling costs and manufacturing complexity, are also absent. Identical primary components used as top and bottom halves imparts additional economy. Providing doors and card as plain rectangles also reduces costs and still allows for easy customization via, e.g., colors, opacity and materials of these elements, suited to the needs of each individual customer. The housing can be fully assembled at factory so that a technician learns how to assemble the unit as she or he disassembles it to allow for cable installation. The present design further provides for strain relief tied down on one component and fiber management on a separable floor. Finally, since the chassis and backplane frame can be loaded with fibers and couplings while outside housing, testing may be performed on an essentially complete installation, yet every component and every inch of fiber is accessible.

Although the invention has been described with reference to specific embodiments, this description is not meant to be construed in a limiting sense. Various modifications of the disclosed embodiment, as well as alternative embodiments of the invention, will become apparent to persons skilled in the art upon reference to the description of the invention. It is therefore contemplated that such modifications can be made without departing from the spirit or scope of the present invention as defined in the appended claims.

I claim:

1. A device for managing a plurality of interconnections of optical fiber cables, comprising:

a housing constructed of top and bottom halves, said top half being substantially identical to said bottom half, and detachable therefrom, each of said halves having a generally rectangular base With two opposite ends, and two sidewalls formed at said ends, respectively, said sidewalls extending generally orthogonal to said base, each sidewall on one of said halves being attached to an opposing sidewall on another of said halves, said housing further having a rear end and a front end;

means located in said housing for supporting a plurality of fiber optic interconnection devices;

a rear panel member attached to said housing at said rear end;

a front panel member attached to said housing at said front end, said front panel being movable between a closed position and an open allowing access to an interior portion of said housing; and means for mounting said housing on an exterior support member.

2. The device of claim 1 further comprising a chassis member located in said inner portion of said housing, said supporting means being attached to said chassis member.

3. The device of claim 1 wherein each of said housing halves are constructed from a single sheet of metal bent to form said base and sidewalls.

4. The device of claim 1 wherein respectively opposed pairs of said sidewalls form a generally linear interface lying approximately half-way between said base of said top half and said base of said bottom half.

5. The device of claim 1 wherein each of said front and rear panels are generally rectangular.

6. The device of claim 2 wherein said chassis member includes means for securing said top and bottom halves of said housing together.

7. The device of claim 2 further comprising a frame member removably attached to said chassis member, said supporting means including at least one bulkhead member removably attached to said frame member.

8. The device of claim 2 wherein said chassis member is removably attached to said housing.

9. The device of claim 7 wherein said bulkhead member is a generally rectangular plate having first and second ends, said first end having means for attachment to a lower portion of said frame member without the need for a separate fastener, and said second end having fastening means for releasably securing the second end to an upper portion of said frame member.

10. The device of claim 7 wherein:

said chassis member has a floor with two opposite ends and two upright members at said ends, extending generally orthogonal to said floor; and said frame member is generally rectangular with two ends, has a length which is approximately equal to the distance between said upright members, and is removably secured to said chassis by frictional engagement of said ends of said frame member with said upright members.

11. A device for managing a plurality of interconnections of optical fiber cables, comprising:

a housing having a rear end, a front end and an interior portion, and constructed of a bottom portion and a top portion which is detachable from said bottom portion;

a chassis member located in said interior portion of said housing and removably attached thereto, said chassis member including means for securing said top and bottom portions of said housing together;

means, attached to said chassis member, for supporting a plurality of fiber optic interconnection devices;

a rear panel member attached to said housing at said rear end;

a front panel member attached to said housing at said from end, said from panel being movable between a closed position and an open allowing access to an interior portion of said housing; and means for mounting said housing on an exterior support member.

12. The device of claim 11 wherein said housing is constructed of top and bottom halves, said top half being identical to said bottom half, and detachable therefrom, each of said halves having a generally rectangular base with two opposite ends, and two sidewalls formed at said ends, respectively, said sidewalls extending generally-orthogonal to said base, and a sidewall on one of said halves being attached to an opposing sidewall on another of said halves.

13. The device of claim 11 further comprising a frame member located in said interior portion of said housing and removably attached to said chassis, said supporting means including at least one bulkhead member removably attached to said frame member.

14. The device of claim 13 wherein:

said chassis member has a floor with two opposite ends and two upright members at said ends, extending generally orthogonal to said floor; and said frame member is generally rectangular with two ends, has a length which is approximately equal to the distance Between said upright members, and is removably secured to said chassis by frictional engagement of said ends of said frame member with said upright members.

15. A method of installing an interconnected pair of optical fibers, comprising the steps of:

obtaining a fiber optic housing which includes a bottom portion, a top portion which is detachable from said bottom portion, and a chassis member located in an interior portion of said housing and removably attached thereto;

removing said chassis member from said housing, said top portion of said housing being detached from said bottom portion prior to said removing of said chassis member;

interconnecting said pair of optical fibers with an interconnection device;

mounting said interconnection device to said chassis member;

replacing said chassis member in said housing; and reattaching said top portion of said housing to said bottom portion of said housing after replacing said chassis in said housing.

16. The method of claim 15 wherein said housing further includes a frame attached to said chassis member, and said mounting step is achieved by:

fastening said interconnection device to a bulkhead member; and attaching said bulkhead member to said frame member.

* * * * *